United States Patent [19]

Wallet et al.

[11] Patent Number: 4,484,610
[45] Date of Patent: Nov. 27, 1984

[54] HEAVY DUTY PNEUMATIC TIRE TREAD

[75] Inventors: Bill J. Wallet, Marshallville; A. Robert Casimiro, Akron, both of Ohio

[73] Assignee: The Firestone Tire & Rubber Company, Akron, Ohio

[21] Appl. No.: 419,334

[22] Filed: Sep. 17, 1982

[51] Int. Cl.³ .................. B60C 11/08; B60C 11/12
[52] U.S. Cl. .................. 152/209 R; D12/142
[58] Field of Search .......... 152/209 R, 209 A, 209 B, 152/209 NT, 209 NT, 209 D; D12/141–145, 146–149, 150–151

[56] References Cited

U.S. PATENT DOCUMENTS

| D. 208,132 | 7/1967 | Wittenmyer | D90/20 |
| D. 220,739 | 5/1971 | Bartlett | D90/20 |
| D. 222,322 | 10/1971 | Pope | D90/20 |
| D. 251,187 | 2/1979 | Mirtain et al. | D12/143 |
| D. 251,661 | 4/1979 | Grosch et al. | D12/143 |
| D. 253,642 | 12/1979 | Amarger | D12/142 |
| D. 261,380 | 10/1981 | Amarger | D12/143 |
| D. 262,281 | 12/1981 | Candiliotis | D12/142 |
| 3,675,700 | 7/1972 | Verdier | 152/209 R |
| 3,707,177 | 12/1972 | Boileau | 152/209 R |

FOREIGN PATENT DOCUMENTS 140606 11/1980 Japan .................. 152/209 D

Primary Examiner—Lois E. Boland
Attorney, Agent, or Firm—Ernst H. Ruf

[57] ABSTRACT

A heavy duty pneumatic tire tread includes a tread portion formed of five ribs separated by four circumferential zig-zag grooves, wherein each groove is made up of successive circumferentially and obliquely alternating one-half pitches having two different lateral widths, each of which remains substantially constant throughout its circumferential extent and wherein, within each one-half groove pitch, when viewed in the lateral direction, the lateral widths of the center grooves are of a first width whereas the lateral widths of the shoulder grooves are in the second width. The oblique angulation of the zig-zag grooves, relative to the circumferential direction of the tire changes every one-half pitch, with the degree of angulation, when viewed in a lateral direction, differing from the center grooves to the shoulder grooves.

7 Claims, 2 Drawing Figures

HEAVY DUTY PNEUMATIC TIRE TREAD

TECHNICAL FIELD

The field of art to which this invention pertains is that of heavy duty pneumatic tires particularly an improved tire tread for use on tires for heavily loaded vehicles, such as trucks, buses and the like.

BACKGROUND ART

U.S. Pat. No. Des. 261,380 to Amarger discloses a tire tread having five circumferential zig-zag ribs separated by four grooves. A plurality of transversely-extending basically Z-shaped sipes are provided in each of the ribs and while they do not intersect the grooves, they do not appear to be centrally located within each of the one-half pitches. The void areas of the grooves, if they change at all, do not appear to change in the manner of the present invention.

U.S. Pat. No. Des. 253,642 to Amarger, again discloses a tire tread having five circumferentially extending zig-zag ribs separated by four intermediate grooves. This tread pattern appears to utilize a change in groove areas in both the circumferential and transverse directions.

U.S. Pat. No. Des. 262,281 to Candiliotis discloses a pneumatic tire tread having five circumferentially-extending zig-zag ribs separated by four adjacent grooves. The grooves do not appear to have alternately-sized portions and the sipes do not appear to be centrally located.

U.S. Pat. No. Des. 251,187 to Mirtain, et al, discloses a tire tread having four ribs and three grooves wherein there does not appear to be a change in groove areas in both the circumferential and transverse directions.

U.S. Pat. No. Des. 208,132 to Wittenmyer discloses a tire tread having five circumferential ribs separated by four intermediate grooves wherein the pitch of the grooves alternates and the size of the grooves appears to change with the changing pitch, however, the groove pitches do not alternate in a lateral direction.

U.S. Pat. No. Des. 222,322 to Pope discloses a pneumatic tire tread having seven ribs and six grooves wherein the angled portions of the grooves appear to be narrower than the relatively straight circumferential portions.

U.S. Pat. No. Des. 220,739 to Bartlett discloses a tire tread having five circumferential ribs and four zig-zag grooves wherein circumferentially alternating pitch portions of the grooves appear to be of a continuously-changing dimension.

DISCLOSURE OF THE INVENTION

The present invention pertains to a specifically improved heavy duty tire tread pattern including five continuous circumferential zig-zag ribs separated by four circumferential zig-zag grooves.

The four circumferential zig-zag grooves are comprised of two center grooves and two shoulder grooves wherein each groove is made up of successive circumferentially and obliquely alternating one-half pitches having two different lateral widths, each of which remains substantially constant within its circumferential extent. Furthermore, within each one-half groove pitch, when viewed in the lateral direction, the lateral widths of the center grooves differ from those of the shoulder grooves.

In addition, the oblique angulation of the zig-zag grooves, relative to the circumferential direction of the tire, changes every half pitch, but when viewed in the lateral direction, changes only in degree. Furthermore, every one-half pitch of the zig-zag ribs includes a configured sipe therein, each of which is substantially centered both transversely and circumferentially, with circumferentially successive sipes being substantially allochiral.

Other features and advantages of the invention will become more readily understood by persons skilled in the art when following the best mode description in conjunction with the several drawings.

BEST MODE FOR CARRYING OUT THE INVENTION

Figure 1:
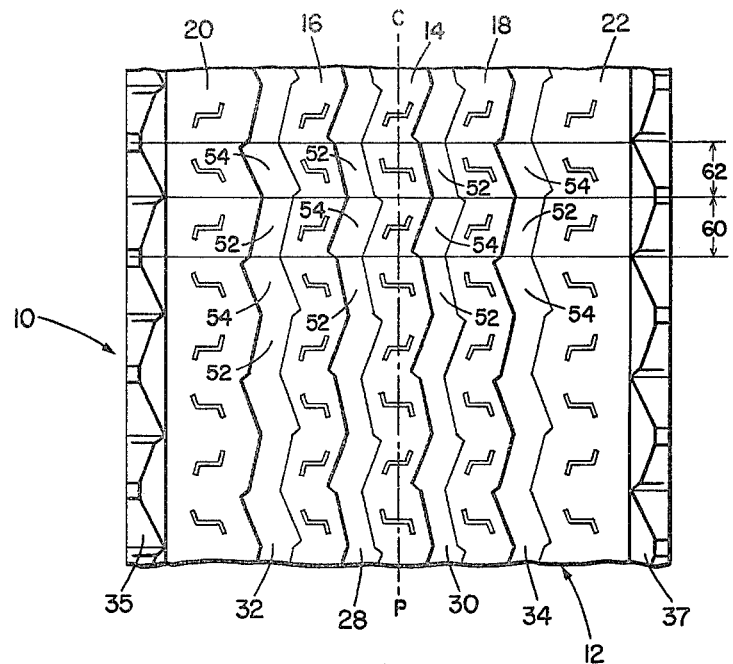
FIG. 1 is a plan view of a portion of the heavy duty pneumatic tire tread of the present invention.

Referring now to the drawings, specifically FIG. 1, there is illustrated a plan view portion of the improved tread 12 of a pneumatic radial tire 10 of the present invention. Tread portion 12 is formed of five continuous circumferential undulating, zig-zag or sinusoidal ribs, namely, center rib 14, intermediate ribs 16 and 18 as well as shoulder or edge ribs 20 and 22. Center rib 14 is located substantially in the center portion, e.g., straddling the mid-circumferential center plane (CP) of tread portion 12 and is separated from intermediate ribs 16 and 18 by two circumferential zig-zag center grooves 28 and 30 located on either side of center rib 14. Shoulder ribs 20 and 22 are spaced from intermediate ribs 16 and 18 by two circumferential zig-zag shoulder grooves 32 and 34, respectively.

Figure 2:
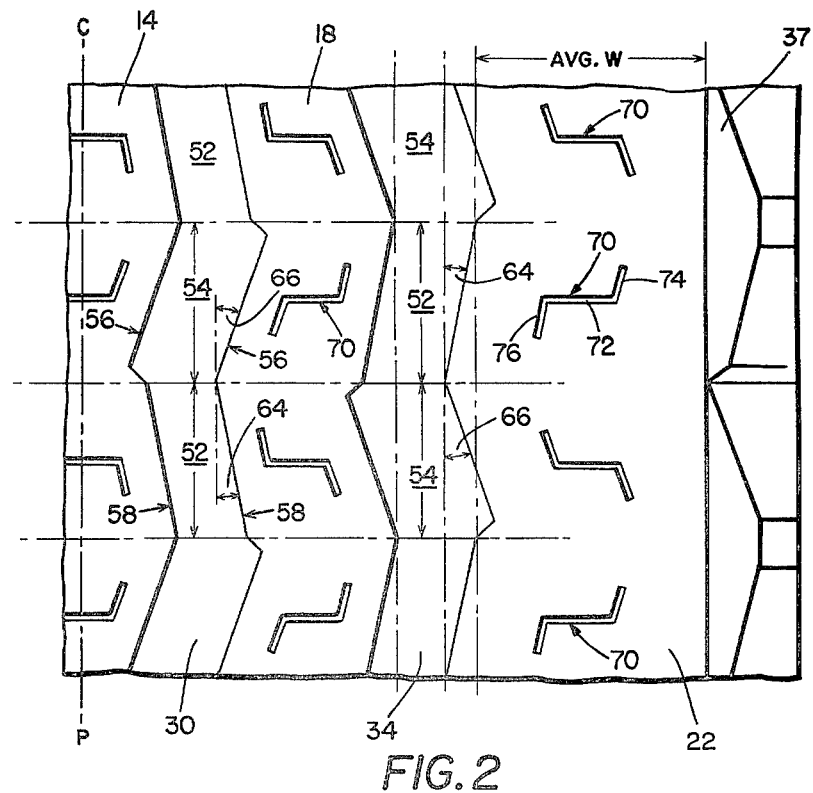
FIG. 2 is an enlargement of a portion of the plan view of the tread shown in FIG. 1.

It should be noted that circumferential zig-zag grooves 28, 30, 32 and 34 are comprised of successive circumferentially and obliquely alternating one-half pitches 52 and 54 wherein the latter has a greater lateral width (measuring perpendicularly to the rib walls defining the edges of the grooves in a manner indicated by arrows 56 and 58 in FIG. 2). As best seen in FIG. 2, each one of groove one-half pitch portions 52 and 54 remains substantially constant in width within its circumferential extent, i.e., portion 52 and 54 are not of variable width although their longitudinal or circumferential length may change in the circumferential direction around the tire periphery. It is however important to note that the circumferential length of the laterally aligned half pitch portions in each of grooves 28, 30, 32 and 34 remain constant. For example, half pitch portions 52, 54, 54 and 52 of grooves 28, 30, 32 and 34 in transverse tread area 60 (shown in FIG. 1 as extending from tire shoulder 35 to tire shoulder 37) all have the same circumferential length, which, however, may not necessarily be the same length of the half pitch portions 54, 52, 52 and 54 of the noted grooves in adjacent transverse tread area 62.

As best seen in FIG. 1, it should also be clear that center grooves 28 and 30 always have their groove portions 52 and 54 transversely aligned, i.e., two transversely aligned narrow portions 52 followed by two circumferentially spaced but transversely aligned wide groove portions 54. In a similar manner, shoulder grooves 32 and 34 have their groove one-half pitch portions transversely aligned; however, a narrow shoulder groove one-half pitch portion 52 is always transversely aligned with a wide center groove one-half pitch portion 54 and vice versa, which serves to maintain a balanced rib-to-groove area as should be evidenced by a comparision of transverse tread areas 60 and 62 in FIG. 1.

As already seen in FIG. 1, but even more graphically shown in FIG. 2, the oblique angulation of zig-zag groove one-half pitch portions 52 and 54, relative to the circumferential direction of tire 10, changes every one-half pitch. Thus, the oblique angulation of groove one-half pitch portion 52, indicated by angle 64, is less than the oblique angulation of groove one-half pitch portion 54, indicated by angle 66.

In addition to the change in the degree of angulation, as defined by angles 64 and 66, it should also be noted that the direction of obliqueness of groove one-half pitch portions 52 and 54 changes every half pitch, i.e., they are alternately inclined to the left and right shoulders 35 and 37 of tire 10.

As shown in the drawings, every one-half pitch of each of zig-zag ribs 14, 16, 18, 20 and 22 includes a configured sipe 70 having a major body portion 72 and oppositely directed leg portions 74 and 76, depending at an obtuse bias angle in opposite directions, from the extremities of major body portion 72. Each sipe 70 is substantially centered both transversely and circumferentially within each zig-zag rib one-half pitch portion, with major body portion 72 extending solely in the transverse direction and having a depth substantially equal to the depth of the zig-zag grooves. Furthermore, while sipes 70 are parallel and aligned in the transverse direction, circumferentially successive ones of sipe 70 are substantially allochiral or of mirror-image shape.

The specific combination of the pattern of tread portion 12, together with the specific radial tire construction set forth in copending application Ser. No. 419,354, filed Sept. 17, 1982, also assigned to the assignee of this invention, produces a markedly superior wearing tire 10, especially when used in the steering position on heavy-duty trucks. In this position, the resistance to irregular wear has resulted in approximately 60 percent more mileage than state of the art tires currently sold in the marketplace.

From the foregoing, it is believed that those familiar with the art will readily recognize and appreciate the novel concepts and features of the present invention. Obviously, while the invention has been described in relation to only one embodiment, numerous variations, changes, substitutions and equivalents will present themselves to persons skilled in the art and may be made without necessarily departing from the scope and principles of this invention. As a result, the embodiment described herein is subject to various modifications, changes, and the like without departing from the scope and spirit of the invention, with the scope thereof being determined solely by reference to the claims appended hereto.

What is claimed is:

1. In a pneumatic radial tire for use in heavy vehicles, said tire having a tread portion and a belt layer in a crown of a tire body reinforced by a toroidal carcass extending between a pair of annular bead cores, said tread portion being formed of five continuous circumferential zig-zag ribs separated by four circumferential zig-zag grooves, the improvement comprising; said four circumferential zig-zag grooves having two center grooves and two shoulder grooves, wherein each groove is made up of successive circumferentially and obliquely alternating one-half pitches having two different lateral widths and wherein each one-half pitch is of a substantially uniform width, each of which widths remains substantially constant throughout its circumferential extent, and wherein, within each one-half groove pitch, when viewed in the lateral direction, the lateral widths of said center grooves are of a first width whereas the lateral widths of said shoulder grooves are of a second width.

2. The pneumatic tire of claim 1 wherein the oblique angulation of the said zig-zag grooves, relative to the circumferential direction of said tire, changes every one-half pitch.

3. The pneumatic tire of claim 2 wherein said oblique angulation, within each one-half groove pitch, when viewed in the lateral direction, changes only in degree.

4. The pneumatic tire of claim 1 wherein, within each one-half groove pitch, when viewed in the lateral direction, the degree of angulation of said center grooves, relative to the circumferential direction of said tire, differs from that of said shoulder grooves.

5. The pneumatic tire of claim 1 wherein every one-half pitch of said zig-zag ribs includes a configured sipe, each of said sipes being substantially centered both transversely and circumferentially therewithin.

6. The pneumatic tire of claim 5 wherein circumferentially successive ones of said configured sipes are substantially allochiral.

7. The pneumatic tire of claim 5 wherein each of said sipes includes a main body portion that extends solely in the transverse direction and has a depth substantially equal to the depth of said zig-zag grooves.

* * * * *